United States Patent
Nair et al.

(10) Patent No.: US 10,776,359 B2
(45) Date of Patent: Sep. 15, 2020

(54) ABSTRACTLY IMPLEMENTED DATA ANALYSIS SYSTEMS AND METHODS THEREFOR

(71) Applicant: Saama Technologies Inc., Campbell, CA (US)

(72) Inventors: Anil Nair, Mumbai (IN); Krunal Patel, Gujarat (IN); Vidya Sagar Anisingaraju, San Jose, CA (US)

(73) Assignee: Saama Technologies, Inc., Campbell, CA (US)

( * ) Notice: Subject to any disclaimer, the term of this patent is extended or adjusted under 35 U.S.C. 154(b) by 359 days.

(21) Appl. No.: 14/971,885

(22) Filed: Dec. 16, 2015

(65) Prior Publication Data
US 2016/0196304 A1    Jul. 7, 2016

Related U.S. Application Data (60) Provisional application No. 62/124,799, filed on Jan. 5, 2015.

(51) Int. Cl.
*G06F 16/2455* (2019.01)
*G06Q 10/06* (2012.01)

(52) U.S. Cl.
CPC ....... *G06F 16/2455* (2019.01); *G06Q 10/067* (2013.01)

(58) Field of Classification Search
None
See application file for complete search history.

(56) References Cited

U.S. PATENT DOCUMENTS

| | | | |
|---|---|---|---|
| 5,924,072 A | 7/1999 | Havens | |
| 6,512,919 B2 * | 1/2003 | Ogasawara | G06Q 20/208 186/61 |
| 7,483,842 B1 | 1/2009 | Fung et al. | |
| 2003/0004790 A1 | 1/2003 | Calderaro et al. | |
| 2003/0069953 A1 * | 4/2003 | Bottom | H04L 41/0681 709/223 |
| 2006/0212486 A1 | 9/2006 | Kennis et al. | |
| 2009/0187471 A1 | 7/2009 | Beaton et al. | |
| 2009/0287642 A1 | 11/2009 | Poteet et al. | |
| 2012/0221486 A1 | 8/2012 | Leidner et al. | |
| 2012/0296845 A1 | 11/2012 | Andrews et al. | |
| 2013/0262501 A1 * | 10/2013 | Kuchmann-Beauger | G06F 16/24535 707/769 |
| 2013/0297543 A1 | 11/2013 | Treiser | |
| 2014/0100922 A1 | 4/2014 | Aycock | |
| 2015/0310508 A1 | 10/2015 | Pattekar et al. | |
| 2016/0179877 A1 * | 6/2016 | Koerner | G06F 16/243 707/721 |

OTHER PUBLICATIONS

Oracle® Database 11g Release 2 is Now Available Sep. 1, 2009, Oracle, http://www.oracle.com/us/corporate/press/032365.*

(Continued)

*Primary Examiner* — Jason G Liao
(74) *Attorney, Agent, or Firm* — Kang S. Lim (57) ABSTRACT

Methods and apparatuses for creating data analysis (DA) systems for generating insights (also known as results) from a plurality of data sources without requiring the designer/implementer of the DA system or the user to understand complicated technology details such as for example coding, big data technology or high-end business analytics algorithms.

15 Claims, 7 Drawing Sheets

(56) References Cited

OTHER PUBLICATIONS

Oracle Database New Features Guide 11g Release 2 Sep. 15, 78 pages.*
Ashdown et al., Oracle Database Concepts 11g Release 2 Sep. 11, Oracle, toc, Chapter 7.*
Chant et al., Oracle Database Performance Tuning Guide 11g Release 2 Jun. 14, Oracle, toc, Chapters 11, 17.*
Strohm, Oracle Clusterware Administration and Deployment Guide 11g Release 2 Jun. 15, toc, Appendix F.*
Anand, The world of Oracle API Feb. 12, 2008, oracleappshub.com, http://www.oracleappshub.com/ebs-suite/the-world-of-oracle-api/.*
Tsekouras, Use DBMS_SQLTUNE.IMPORT_SQL_PROFILE to force a hint to a query 15 Sep. 13, ORACLE DBA, http://lefterhs.blogspot.com/2013/09/use-dbmssqltuneimportsqlprofile-to.html.*
Oracle Database 11gR2: Clustering—Grid Plug and Play—Online Course NEW 2010, Oracle University, http://education.oracle.com/pls/web_prod-plq-dad/view-pdf?c_org_id=56&c_lang=BG&c_id=D64359GC10.*
Oracle Real Application Clusters in Oracle VM Environments, Mar. 12, Oracle Sys, https://web.archive.org/web/20120417175948/ https://www.oracle.com/technetwork/database/clustering/oracle-rac-in-oracle-vm-environment-131948.pdf.*
Romanenko, Oracle RAC 11g Database on Linux Using Virtual Box Dec. 12, lab128.com, http://www.lab128.com/rac_installation_using_vb/article_text.html.*
Strohm, Oracle Clusterware Administration and Deployment Guide 11g Release 1, Jun. 10, 406 pages.*
Caffery, Getting Answers with SELECT Feb. 12, Oracle Magazine, https://blogs.oracle.com/oraclemagazine/getting-answers-with-select.*
Moore et al., Oracle Database Online Documentation Library 11g Release 2 Explicit Cursor Declaration and Definition 2014, Oracle , https://docs.oracle.com/cd/E11882_01/appdev.112/e25519/explicit_cursor.htm#LNPLS01313.*
Feuerstein, Working with Cursors Part 12 in a series of articles on understanding and using PL/SQL Apr. 13, oracle.com, https://blogs.oracle.com/oraclemagazine/working-with-cursors.*
Rich, Oracle Database Reference 11g Release 2, Oracle, https://docs.oracle.com/cd/E11882_01/server.112/e40402.pdf.*
Using Python With Oracle Database 11g date unknown [listed in Google Search as Oct. 28, 2009], Oracle Sys, https://www.oracle.com/technical-resources/articles/database/python-with-database-11g.html.*
An introduction to machine learning with scikit-learn date unknown, scikit-learn.org, v.0.15 https://scikit-learn.org/0.15/tutorial/basic/tutorial.html.*
Recognizing hand-written digits date unknown, sciklit-learn.org, v0.15 https://scikit-learn.org/0.15/auto_examples/plot_digits_classification.html#example-plot-digits-classification-py.*
Reference date unknown, scikit-learn.org, v0.15, https://scikit-kearn.org/0.15/modules/classes.html.*
Sklearn.ensemble.partial_dependence.plot_partial_dependence date unknown, scikit-learn.org, v0.15, https://scikit-learn.org/0.15/modules/generated/sklearn.ensemble.partial_dependence.plot_partial_dependence.html#sklearn.ensemble.partial_dependence.plot_partial_dependence.*
Julio.h et al, Anaconda and distributed execution with MPI 20 Jan. 14, Google Groups, https://groups.google.com/a/continuum.io/forum/#!topic/anaconda/Qde7IgDLGBc.*
Release Notes 15 Oct. 19, anaconda.com, https://docs.anaconda.com/anaconda/reference/release-notes/.*
Hastings, PEP 429—Python 3.4 Release Schedule 18 Mar. 19, python.org, https://www.python.org/dev/peps/pep-0429/.*
Lutz et al, Learning Python 1999, O'Reilly, pp. 4, 140, 218.*

* cited by examiner

ABSTRACTLY IMPLEMENTED DATA ANALYSIS SYSTEMS AND METHODS THEREFOR

CROSS REFERENCE TO RELATED APPLICATIONS

The present application claims priority under 35 USC 119(e) to a provisional application entitled "Saama Fluid Analytics Engine (SFAE)", Application No. 62/124,799, filed on Jan. 5, 2015, which is incorporated herein by reference for all purposes.

BACKGROUND OF THE INVENTION

Business intelligence (BI) is of utmost importance to businesses. Business intelligence involves performing data analytics to answer questions of interest to the business. An example question may be "What is my sales number for this quarter for a certain region." Another question may be "From available data, who are the customers who may likely be defecting to a competitor." In performing data analytics-based business intelligence (DA-BI), it is necessary to gather data from a variety of sources, organize the data, analyze the data, and present the analytics result in a manner that makes sense to the user.

There are existing software applications for performing DA-BI currently. These applications permit the acquisition of data, the organization of stored data, the application of business rules to perform the analytics, and the presentation of the analytics result. In the past, such applications require the use of an expert system integrator company or highly skilled personnel in the IT department (often a luxury that only the largest companies can afford) since these tools require custom coding, custom configuration and heavy customization.

The explosion in the volume of data in the last few years means that the customer now has more data and more variety of data formats to work with. At the same time, customers are demanding more in-depth answers from the available data. This increase in data volume and data formats, as well as the increased need of customers, has created a need to update or change many existing business intelligence applications. However, due to the customized hard coding nature of existing BI-applications, many businesses have not been willing or simply do not have the money and/or time to commit to updating their existing BI system or purchasing a new BI system.

Furthermore, new technologies are now available for data storage, data acquisition, data analysis, and presentation. Big data or cloud computing (whether open-source or proprietary) are some examples of such technologies. Some of these technologies have not yet been widely adopted by the BI industry. Being new, the level of expertise required to make use of these technologies is fairly high since there are fewer people familiar with these technologies. This trend drives up the cost of implementing new BI systems or updating existing BI systems for customers, particularly if the customers desire to make use of the new technologies.

In view of the foregoing, there is a need for a new approach to create and/or update data analytics applications for customers.

SUMMARY OF THE INVENTION

The invention relates, in an embodiment, to a computer-implemented method for generating business intelligence (BI) results from data obtained from a plurality of data sources. The method includes receiving a BI query issued to computer resource. The method also includes automatically accessing, responsive to information from the BI query, using the computer resource metadata to obtain at least data definition and design definition, the metadata being specifically pertaining to the business intelligence query. The method further includes employing, using the computer resource, data from the metadata for managing at least data acquisition and data analysis by a plurality of BI logic subcomponents, wherein data in the metadata specifies at least data flow among the BI logic subcomponents and wherein the data analysis generates at least one business intelligence insight. The method additionally includes presenting the business intelligence insight to a user interface device for viewing.

In another embodiment, the invention relates to a computer-implemented business intelligence (BI) system for obtaining a business intelligence insight from a plurality of data sources. The system includes a data acquisition component having a plurality of data acquisition-related subcomponents and a data analysis component having a plurality of data analysis-related subcomponents. The system also includes a data presentation component having a plurality of data presentation-related subcomponents. The system additionally includes a metadata layer that govern at least data flow among the plurality of data acquisition-related subcomponents and data analysis-related subcomponents, wherein the metadata layer is created in advance at design time and interpreted during executing time to govern data acquisition by the data acquisition component and data analysis by the data analysis component in obtaining the business intelligence insight.

In another embodiment, the invention relates to a computer-implemented method for creating a business intelligence (BI) system, the BI system configured to generate at least one BI result from data obtained from a plurality of data sources. The method includes filling out, at design time, data fields of a metadata construct, the data fields having data that provides data definition and design definition for a plurality of logic subcomponents of the BI system. The method additionally includes associating the metadata construct with a particular type of BI query, wherein if the BI query is received during execution time, the data in the data fields are employed to manage execution by the plurality of logic subcomponents to obtain the at least one BI result.

Note that the various features of the present invention described above may be practiced alone or in combination. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "only," "first," "initially," "next," "subsequently," "before," "after," "lastly," and "finally," are not meant to limit the scope of the present invention as the embodiments disclosed herein are merely exemplary.

Embodiments of the invention relate to methods and apparatuses for creating data analysis (DA) systems for generating insights (also known as results) from a plurality of data sources without requiring the designer/implementer of the DA system or the user to understand complicated technology details such as for example coding, big data technology or high-end business analytics algorithms.

In one or more embodiments, there exists an abstraction layer, known as a metadata layer, that contains metadata construct pertaining to data definition and design definition for subcomponents of the DA system. The technology details (e.g., what technology is employed to implement a particular subcomponent or to facilitate communication/ storage) is abstracted and hidden from the designer/implementer and/or the user. The subcomponents communicate via APIs (application programming interface) to facilitate plug-and-play extensibility and replacement.

The metadata construct (which may be a file or library or collection of files/libraries) contains information on the data definition (what data to expect; the format of the data; etc.) as well as the design definition (what to do with the receive data; how to store, organize, analyze, and/or output the data, etc.) as well as the data flow among the subcomponents. Preferably, the metadata construct is created in advance during design time. At execution time, the execution engine receives the BI query from a user, reads the data in a metadata construct that corresponds to that BI query and executes the BI query using data in the metadata construct to enable the subcomponents to retrieve and analyze data as well as output the BI insight.

In one or more embodiments, a user interface, which may be graphical, is employed to create the metadata construct. In one or more embodiments, the metadata construct is an XML, file. The metadata construct represents a standardized manner to communicate with subcomponents of the BI system and contains instructions on how those subcomponents are to act, alone and in coordination with one another, to transform the data from the various data sources into an analysis result such as a business insight. Since the metadata construct is an abstraction of the underlying technology, embodiments of the invention allow implementers to create an end-to-end BI application that takes in a BI query and automatically provide the BI insight simply by populating or creating content in the appropriate metadata construct (as well as some light customization for data output format if desired).

In this manner, an end-to-end DA application (such as a business intelligence application) can be implemented without requiring the time consuming hard coding and expensive/scarce knowledge regarding the underlying technologies/algorithms. Furthermore, by allowing subcomponents to be implemented in a plug-and-play manner via APIs, it is possible to re-use or leverage existing analytics tools or parts thereof (such as an existing analysis module) by simply providing an appropriate API for the module and generating the data definition and design definition for it in the metadata construct. This is a huge advantage to customers who may have already invested substantially in existing data analysis infrastructure.

These and other advantages of embodiments of the present invention will be better understood with reference to the figures and discussions that follow.

Figure 1:
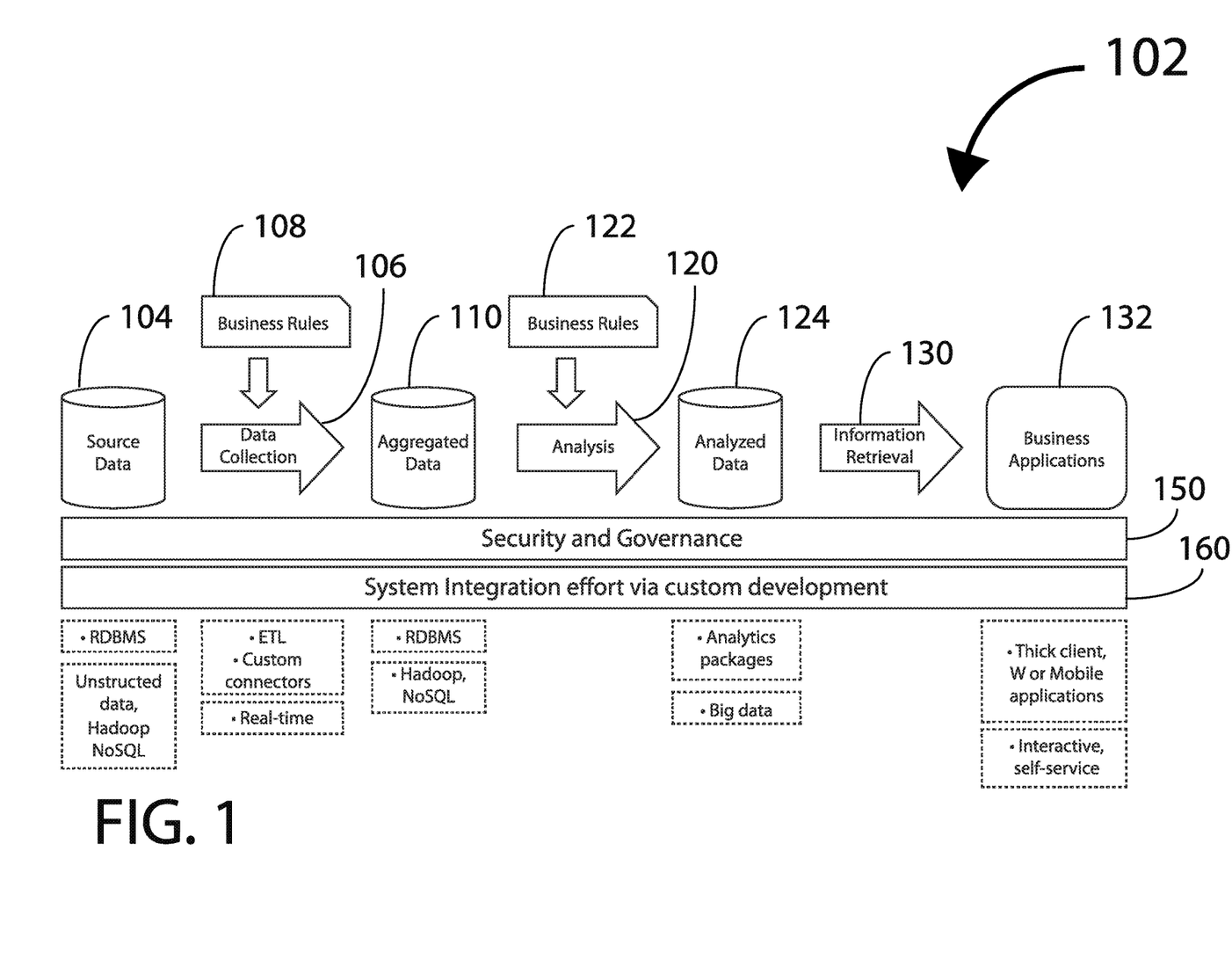
FIG. 1 shows, in accordance with an embodiment of the invention, a typical existing business intelligence (BI) analytics system.

FIG. 1 shows, in accordance with an embodiment of the invention, a typical existing business intelligence (BI) analytics system. In this application, a business intelligence system is used as an example of a data analytics system but it should not be a limitation and the discussion applies to data analytics systems in general.

A BI system 102 receives data from a variety of data sources 104 in a variety of formats. These data sources may include the corporate transactional systems (such as sales or accounting or customer relations), syndicated data (such as from 3rd party), web-based data (such as social media) and streaming data. The data may be stored in a relational database (RDBM) or in big data-related storage facilities (e.g., Hadoop, NoSQL). With regard to format, the data may be in any format including unstructured, structured, streaming, etc.

Data collection 106 pertains to activities required to acquire the data from the data sources 104. Data acquisition may employ ETL (Extract, Transform, Load) technologies or may employ custom connectors to the individual data sources 102 for example. The data collection may happen in batches or in real time.

During data collection, business rules 108 may apply to pre-filter and/or pre-process the data. For example, some syndicated data may be in a specific format to suit the needs of a particular system unrelated to BI (such as reimbursement data from the reimbursement database of insurance companies, which data may include short-hand alphanumeric coding for common procedures and/or medication)

and these formats may need to be converted for more efficient utilization by the analysis component later.

The data collected is then stored in an aggregated data source 110 for ready use by the analysis module. The aggregated data may be stored in a relational database (RDBM) or in big data-related storage facilities (e.g., Hadoop, NoSQL), with its formatting pre-processed to some degree (if desired) to conform to the data format requirement of the analysis component.

The analysis component analyzes (120) the data using business rules 122 and stores the BI insight in analyzed data store 124. The analysis may employ some custom analytics packages or may employ big data analysis techniques for example. At some point in time, the user may desire to know the BI insight and thus information retrieval (130) is performed to obtain the BI insight from the analyzed data store 124 and to present the BI insight to business applications 132. These presentation methods may be self-service or interactive (such as through a webpage that allows the user to sort and organize the data in various ways). The presentation medium may be a thick client, a web or mobile application running on a desktop, laptop, or mobile device for example.

Underlying the above activities is a security and governance subsystem 150 that handles house-keeping and system-related tasks such as scheduling jobs, data access authorization, user access authorization, auditing, logging, etc.

In the past, the implementation of BI system 102 typically involves hard-coding the components, creating custom code to enable the components of FIG. 1 to interoperate and produce the desired BI insight. The system integration effort and custom development (160) require a substantial investment of time and effort during the development, integration, and deployment stages. Because of the rapidly changing technology landscape, a typical company often does not have sufficient IT expertise in-house to build, maintain and/or deploy a BI system if that company desires to utilize the latest technology. Instead, the work is contracted out to integrator firms with special expertise at great cost in each of the development, maintenance, deployment, and upgrade phases.

The hard coding approach makes it difficult and/or expensive to upgrade when new BI insight needs arise and/or when improved technology is available for the tasks of data acquisition, data analysis, and/or data presentation. It also makes it difficult to re-use legacy subcomponents that the business may have already invested in, in the past. This is mainly because of both the cost/time delay involved in re-coding a BI system and the predictable scarcity of knowledgeable experts when new technologies first arrive.

Figure 2:
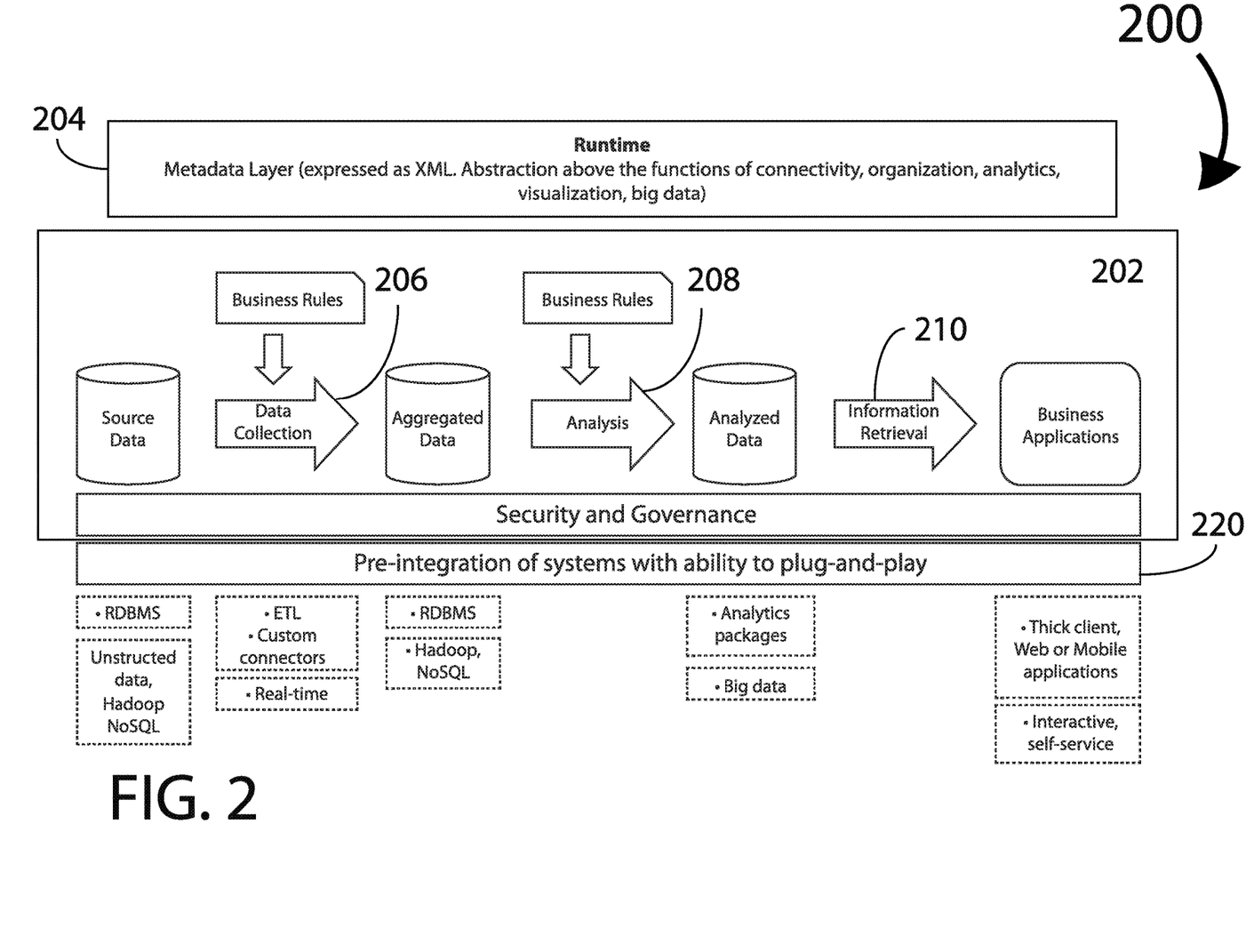
FIG. 2 shows, in accordance with an embodiment of the invention, the conceptual organization of the improved abstractly-implemented data analysis system (AI-DAS)

FIG. 2 shows, in accordance with an embodiment of the invention, the conceptual organization of the improved abstractly-implemented data analysis system (AI-DAS). The conceptual tasks that need to be performed in box 202 are analogous to those discussed in connection with FIG. 1. However, embodiments of the invention pre-integrate (220) the subcomponents (to be discussed later in FIG. 3 and later figures) with plug-and-play capability in order to facilitate their upgradability and extensibility.

More importantly, there exists an abstraction layer, known as a metadata layer 204. The metadata may be implemented by a file or library or a collection of files or libraries and contains data pertaining to the data flow among the subcomponents of components implementing the three tasks of BI system 200 (data collection 206, data analysis 208, and analysis result retrieval/presentation 210). The metadata may also include information about data definition and design definition for each of the subcomponents. Generally speaking, data definition pertains to the location where the data comes from and where it is to be outputted, the format of the data, and the like. Design definition generally pertains to the operation in each subcomponent including for example what to do with the inputted data, how to store, organize, analyze, output the data, etc.

The metadata 204 is designed during design time in order to define the operation of the subcomponents and the data flow among the subcomponents, and by extension, the operation of the resulting BI system for a particular type of query. During design time, the designer/implementer is shielded or isolated from the technology details of the subcomponents. The designer/implementer task becomes one of populating the metadata construct with sufficient information to allow each subcomponent to know what data to expect and to output, and how each subcomponent is to behave during execution. In an embodiment, a graphical user interface is provided to assist in the task of filling out the data fields of the metadata. Because the implementer/designer of the BI system only needs to work at the high level of abstraction of the metadata layer, expensive skilled knowledge regarding the newest technology is not required. Further, because the system can be easily reconfigured (simply by creating another metadata) to handle different analysis tasks or accommodate different/substitute subcomponents, re-use of many of the subcomponents is promoted.

At execution time, the BI query from the user is intercepted and a metadata construct (file, library, or set of files/libraries) appropriate to that BI query is retrieved. The execution engine then reads and interprets the data in the metadata in order to know how to utilize the subcomponents to perform tasks to arrive at the BI insight requested by the BI query. Again, the user does not need know the details of the underlying technologies or even the presence/structure of the metadata itself. As long as the user can input a BI query that can be parsed and understood by the BI system, the BI system will automatically select the appropriate metadata construct and will automatically carry out the required tasks using data from the metadata construct and the subcomponents of the BI system.

Figure 3:
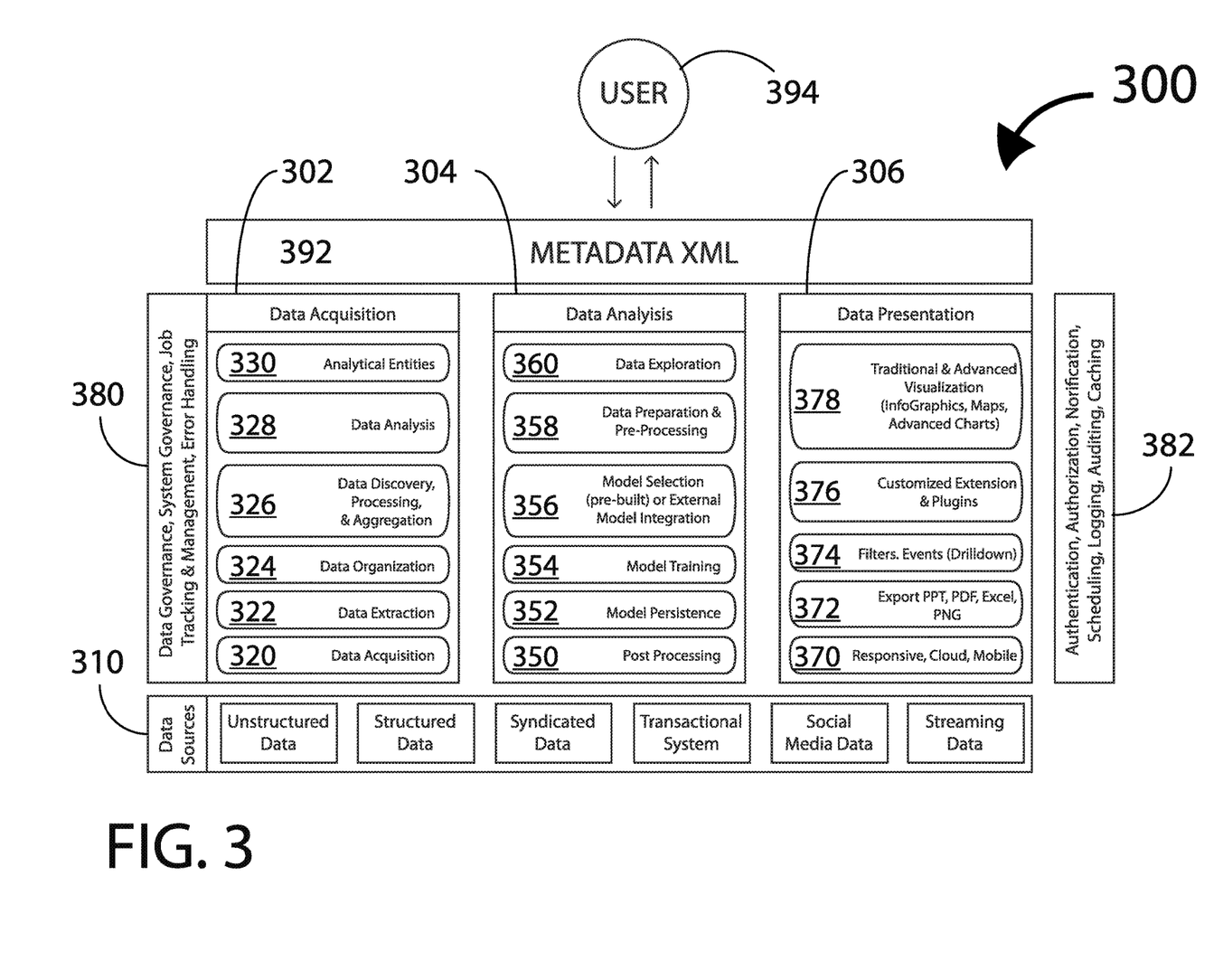
FIG. 3 shows, in accordance with an embodiment of the present invention, the details of one implementation of the abstractly-implemented data analysis system (AI-DAS) system.

FIG. 3 shows, in accordance with an embodiment of the present invention, the details of one implementation of the abstractly-implemented data analysis system (AI-DAS) system 300. AI-DAS 300 includes three main components: Data acquisition, data analysis, and data presentation.

Data acquisition 302 relates to getting the data, organizing the data, extracting the data, storing the data. As shown in box 310, the various data sources include unstructured data (e.g., freeform data such as the text entered by patient comments or doctor/nurse comments), structured data such as data enter into fields of a form, syndicated data such as data purchased or received from third parties, transactional system data such as data directly obtained from the ERP system or the enterprise data store of the company, social media data such as data from Facebook, Twitter, Instagram, and the like. The data may be received in batches or may be streaming data. These are only examples of data sources that may be employed for analysis by the AI-DAS 300.

Within data acquisition component 302, there exist a plurality of subcomponents shown as data acquisition-related subcomponents 320-330. Subcomponent 320 pertains to the task of data acquisition, which relates to how the data is acquired from various sources 310. Subcomponent 322 relates to data extraction, which contains the logic to extract the data sources 310. Subcomponent 324 pertains to data organization, which contains the logic to organize the extracted data. Subcomponent 326 pertains to certain preprocessing of the data. For example, the extracted data is discovered (such as using parsing or artificial intelligence) processed (such as mapping) and aggregated. Splitting and merging of various data items may also be done.

Subcomponent 328 pertain to additional higher level processing of the data, if desired. Subcomponent 330 pertains to grouping data sources into a transactional unit that can be processed as a single entity. For example, the total number of data sources may comprise hundreds of data sources available. However, for a particular BI query, only certain data resources are used. These can be grouped together in a single analytical entity for ease of administration.

Data analysis component 304 relates to analyzing the data and extracting meaning from the aggregated data that is output by data acquisition component 302. Within data analysis component 304, there exists a plurality of subcomponents shown as data analysis-related subcomponents 350-360. Subcomponent 360 relates to data exploration since at this stage, it may not be known what the data contains. Artificial intelligence or pattern matching or keywords may be employed to look for meaning in the data. The data can be prepared and preprocessed in 358 to convert the data into a format for use by the algorithm.

The three subcomponents 352, 354, and 356 represent the machine learning approach that is employed for this example of FIG. 3. In subcomponent 356, the model is selected which may be prebuilt or an external model may be integrated. In subcomponent 354, the model is trained and once the model is selected 356 and trained in 354, the model may be persisted 352 to process the incoming data. Post-processing 350 relates to preparing the data for presentation, which occurs in data presentation component 306.

Data presentation subcomponent 306 relates to how to present the data to the user. The data may be presented using traditional and advanced visualization methods (378) such as infographics, maps, and advanced charts. Legacy presentation tools may also be employed via standard or customized extensions and plug-ins 376. Tool may be provided for the user to filter and to drill down the data, essentially allowing the user to explore the result in 374. The data may also be exported into a desired data format for later use. This is shown 372 wherein the example the formats are Power-Point, PDF, Excel, PNG. The presentation mechanism can be interactive or static, and presentation data can be sent via the cloud and/or internal network to a laptop, desktop, or mobile device (370).

Subcomponent 380 relates to data governance, system governance, job tracking and management, and error handling. These are tasks related to managing the hardware and software resources to perform the analysis. Subcomponent 382 relates to control of data access and job execution and user access. Thus, there is shown authentication, authorization, notification, scheduling of jobs. Logging, auditing, and intelligent caching of data to improve execution speed are also shown in 382.

A metadata construct 392 is shown interposing between the user 394 and the components/subcomponents of the AI-DAS 300. As mentioned, this metadata contains the higher level abstraction of the subcomponents and allow the AI-DAS to be implemented without knowing the complex underlying technology details.

All the subcomponents shown in each of the data acquisition, data analysis, and data presentation components can be either off-the-shelf, custom created, open-source, or legacy subcomponents. For plug-and-play implementation, these subcomponents preferably communicate using the API model. These subcomponents can be implemented on an internal network, in the cloud using a cloud-based computing paradigm (such as through Amazon Web Services or Google Web), or a mixture thereof. Generically speaking, these are referred to herein as computer resource.

Figure 4:
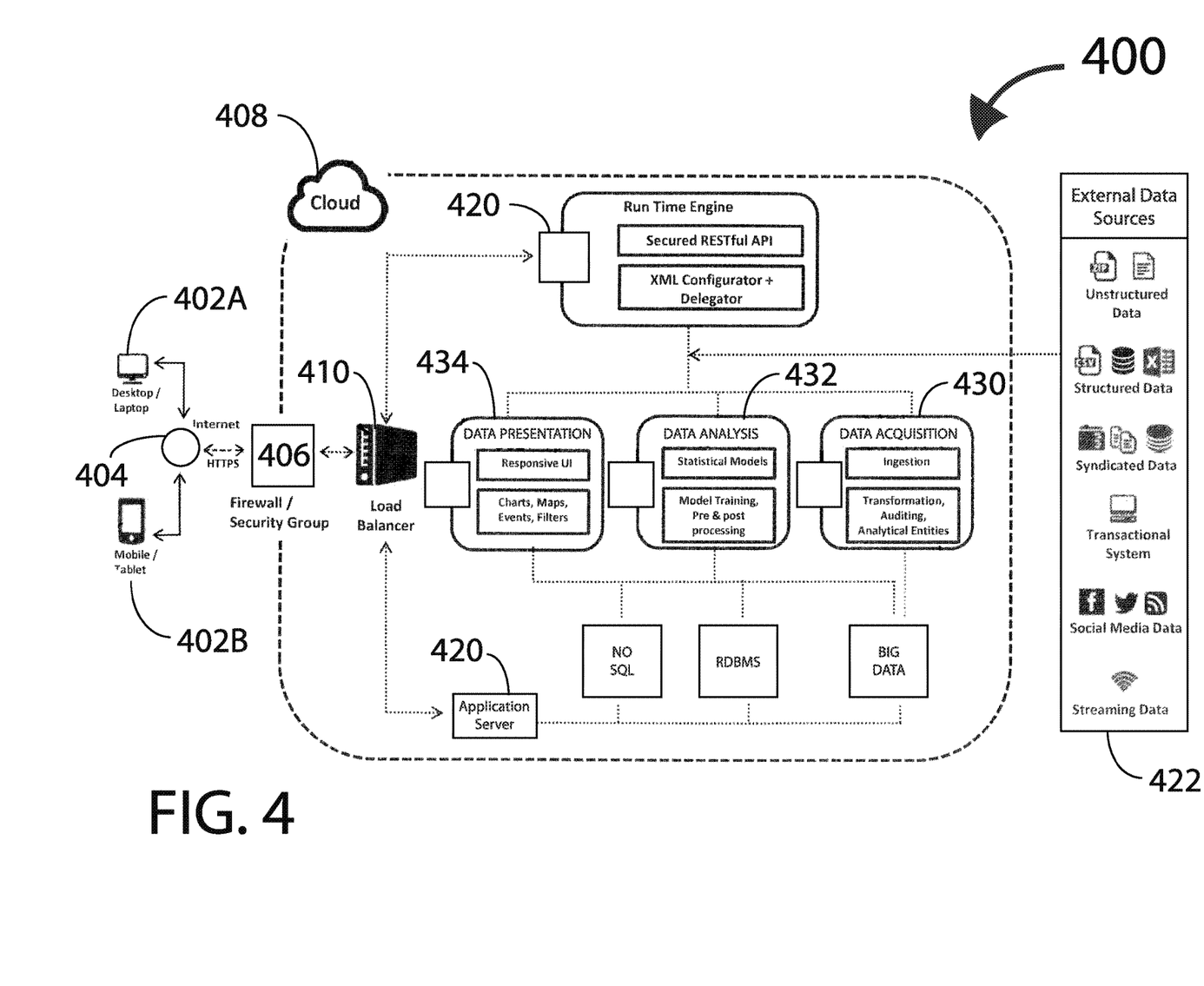
FIG. 4 shows a system architecture of an example AI-DAS implementation.

FIG. 4 shows a system architecture of an example AI-DAS implementation, including user interface devices 402A and 402B (desktop/laptop and mobile devices respectively). These devices can access the AI-DAS system 400 via in the Internet 404 using for example the HTTPS protocol. Firewall/security group 406 and cloud 408 show that components/subcomponents and data storage employed to implement the AI-DAS may reside in the cloud or may reside behind the firewall within a company or can be both.

The AI-DAS operation is governed by a load balancer 410 which load balances multiple copies of the AI-DAS runtime engine 420. For ease of illustration, the multiple implementations of the AI-DAS runtime engine 420 are shown at both the top and the bottom of FIG. 4. At the top of FIG. 4, these multiple instantiations of the AI-DAS runtime engine interacts with the API (such as Secure RESTful API) that governs the communication between subcomponents in the data acquisition component, the data analysis component, and the data presentation component. The AI-DAS runtime engine also reads the metadata (implemented as an XML in the example) and interpret the XML then delegates the tasks specified by the XML to various subcomponents in the data acquisition, data analysis, and data presentation subcomponents.

Data is received from external data sources 422 and is processed via data acquisition subcomponent 430, data analysis subcomponent 432, and data presentation subcomponent 434. The data is processed by data acquisition subcomponent 422 via ingestion module and transformation, auditing, analytical entities. The aggregated and analyzed data is then stored in the appropriate data store (such as Hadoop big data store), relational database RDBMS, or noSQL data store.

The data analysis subcomponent 432 represents the intelligence component and includes therein statistical models and modules related to model training, pre-and post-processing. The data presentation subcomponent 434 includes the various responsive (interactive) user interfaces and may include traditional presentation tools such as charts, maps, events, filters. As shown in FIG. 4, there may be multiple instantiations of each of the components/subcomponents in addition to different instantiations of multiple runtime engines, all of which can be load balanced to horizontally scale the analytics system to accommodate any volume of analytics jobs.

Generally speaking, there are the two separate phases of building and delivering an AI-DAS end-to-end application. One of the requirements is that the subcomponents employ APIs, allowing them to interoperate using an API model and to receive instructions from the execution engine as the execution engine interprets the metadata. Thus, during design time, a designer/implementer may create the metadata XML that includes the data definition and design definition for the subcomponents. Once the design phase is completed, the system is deployed and ready to produce analysis result during execution time.

During execution time (which occurs when a user inputs a query), the metadata XML is selected for the query, interpreted and executed by the AI-DAS engine, which metadata specifies how each subcomponent would behave based on the parameters specified in the metadata. The metadata also specifies the format of the data that the subcomponents exchange among each another, as well as the overall data flow from data intake from multiple data sources to the presentation of the analytic results to the user interface devices.

Figure 5:
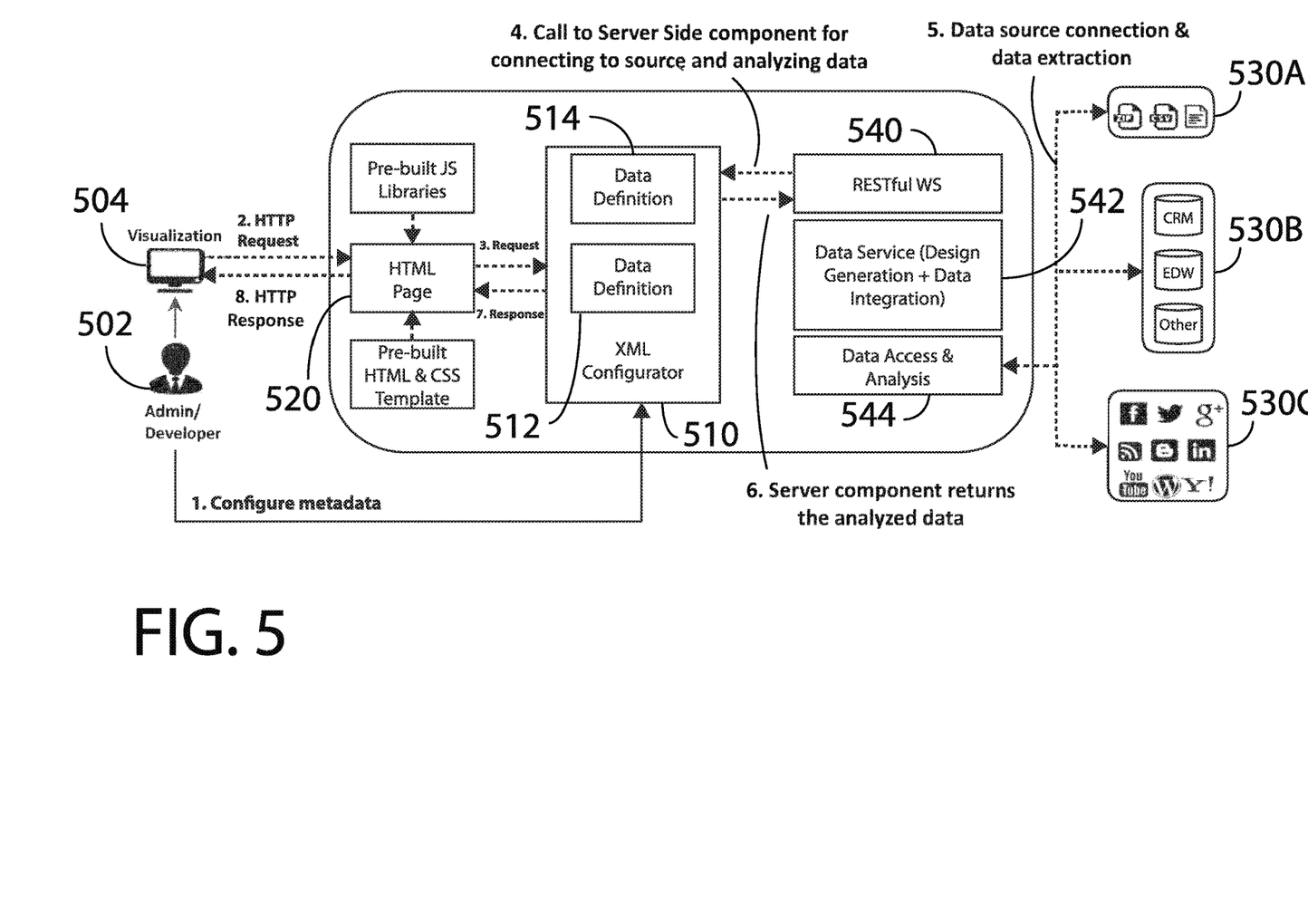
FIG. 5 shows, in accordance with an embodiment of the invention, an example workflow employing the runtime engine in order to perform business intelligence analysis.

FIG. 5 shows, in accordance with an embodiment of the invention, an example workflow employing the runtime engine in order to perform business intelligence analysis. During design time, administrative/developer 502 employs UI device (which may be for example a laptop or desktop computer) 504 to configure the metadata (such as the XML). This is shown as step 1 of FIG. 5. Preferably, a graphical user interface is employed to simplify the task of populating the metadata fields. At this time, any custom HTML templates and custom javascript can also be created to format the output if desired.

With respect to the metadata XML, the admin/developer 502 may define the data. That is the admin/developer may specify where the data comes from and the type of data that is inputted (e.g., free-form, stream, structured, and the like). The admin/developer 502 may also specify the design definition, that is how the data is used in the application. The design definition defines the goal of the data analysis. For example, one goal may be to perform sentiment analysis on conversation data about nurses. Another goal may be to discover the top three hot topics in the unstructured data that is received. Another goal may be to import certain columns in a relational database and run it through a certain model to identify patients who are not satisfied.

The design definition can also specify the manner in which data is outputted. Examples of such specification include the format and the devices and/or data presentation technologies involved. These are shown in 510, 512, and 514 of FIG. 5.

Then during execution time the user may use a UI device to issue a HTTP request (step 2) that is received by the HTML page 520. The HTML page 520 parses the request then issues another request (step 3) to acquire the appropriate associated metadata XML that contains the data definition and the design definition relevant to the instant query.

With this data definition and design definition in the XML, the AI-DAS engine then makes a call to the server-side component for connecting to resources to obtain data and to analyze data. Note that these data sources and the manner in which the data is analyzed are specified by the XML in the data definition and design definition 514 and 512. This is step 4.

In step 5, the data source connections are selected to connect to the appropriate data sources 530A, 530B, and 530C to obtain data for analysis. The analysis is performed by the server subcomponent that employs, in the example of FIG. 5, the RESTful web service 540. Analysis includes performing data service (design generation and data integration) as well as data access and analysis (542 and 544) in accordance with the definition in the XML.

Once data analysis is completed by the AI-DAS server, the server component returns the analyzed data (step 6) and the response (step 7) is provided to the HTML page. The response may be formatted in accordance with the definition in the XML page. The response is then returned to the UI device 504 for viewing by the user and for interaction by the user (step 8)

Figure 6:
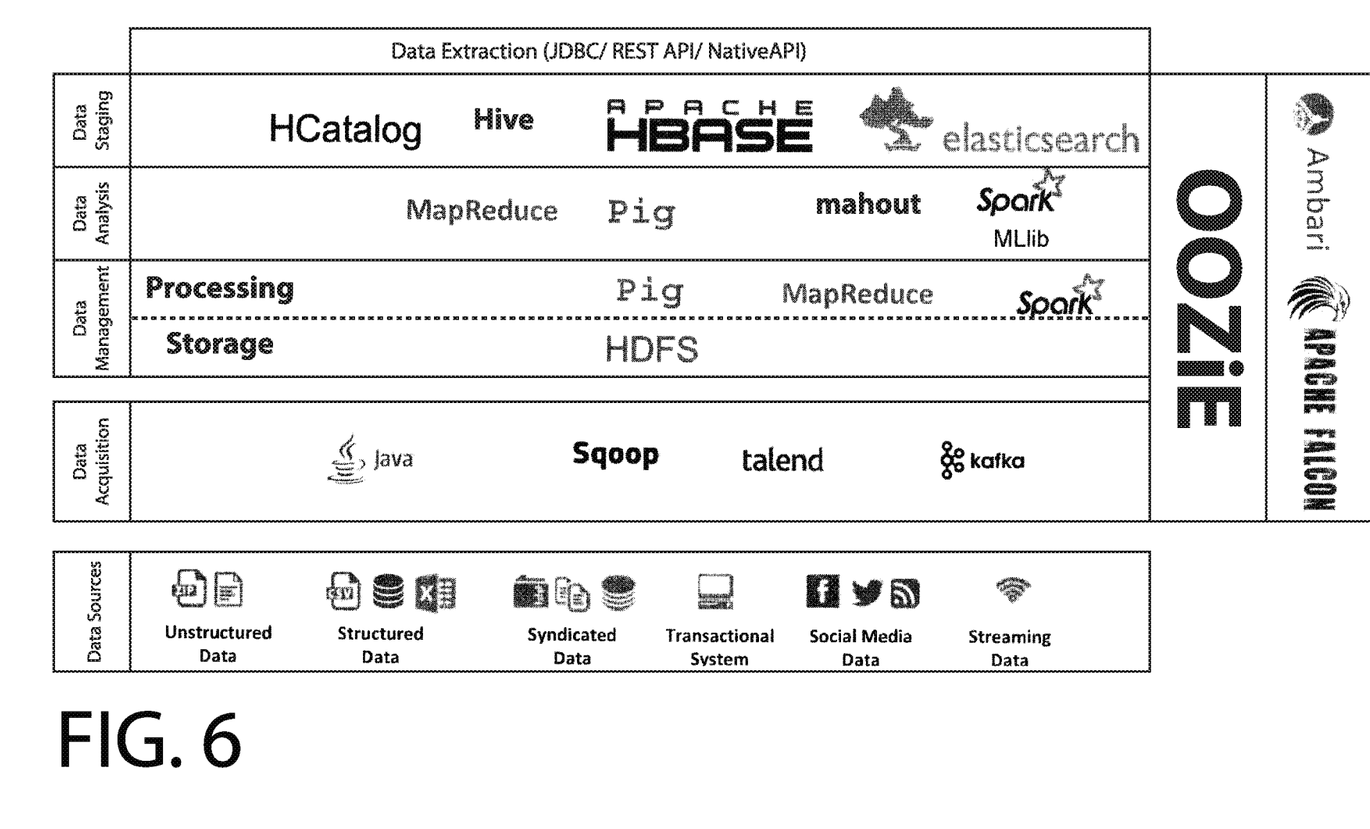
FIG. 6 shows some of the technologies involved in implementing the data sourcing, data acquisition, data management, data analysis, data staging, and data extraction.

FIG. 6 shows some of the technologies involved in implementing the data sourcing, data acquisition, data management, data analysis, data staging, and data extraction. Some of these technologies are well-known in distributed computing/big data for storage (such as Hadoop) and for analysis (such as MapReduce, Spark, Mahout). Workflow engine may be provided by OOZIE while system administration may be provided by Ambari and Apache Falcon.

It should be noted that the technology details of FIG. 6 are hidden from the design/implementer during design time since the designer/implementer needs only be concerned with the metadata population and any optional HTML/JS customization for data outputting. These technology details are also hidden from the customer/user during execution since the customer/user only needs to issue a query that can be parsed to obtain the associated XML, and the rest of the analysis and underlying details regarding technology are handled transparently.

Figure 7:
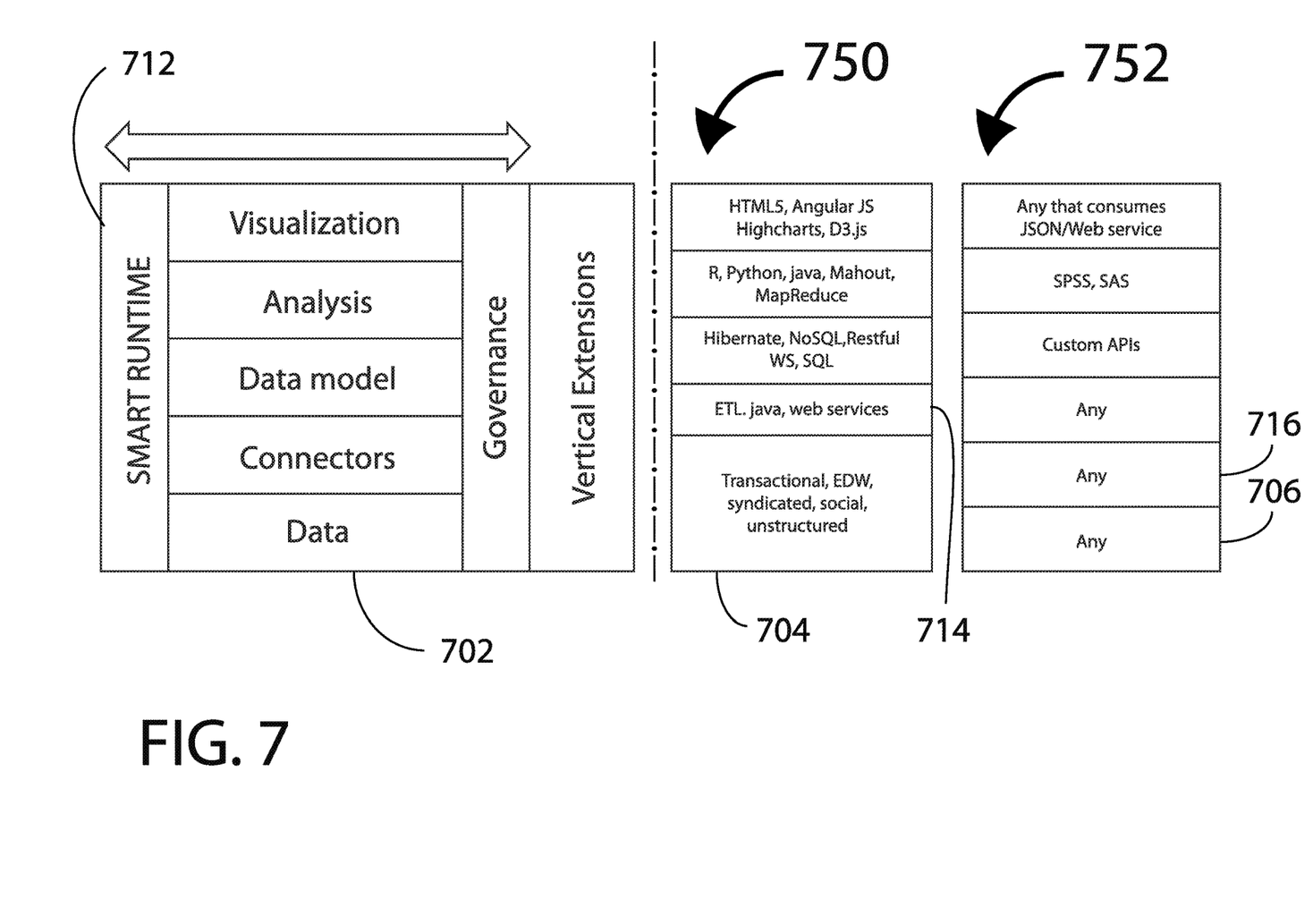
FIG. 7 shows some of the technologies employed in implementing each of the technology stacks in the AI-DAS system.

FIG. 7 shows some of the technologies employed in implementing each of the technology stacks in the AI-DAS system. For example, the data layer 702 may be implemented by (704) transactional, enterprise data warehouse (EDW), syndicated, social, and unstructured data. However, any other alternative data source (706) may be employed.

Connectors layer (712) may be implemented by (714) ETL, Java, Web services. However, any appropriate alternative integration connecting technology (716) may also be employed. The same applies to the data model layer 722, data access layer 724, analysis layer 726, and visualization layer 728. For each of these layers, there is a corresponding list of example technologies in the stack 750 as well as in alternatives/integration 752. One important point to note is since the underlying technology is hidden, the layers (such as data, connectors, data model, data access, and the analysis, visualization) may be implemented by any appropriate technology, including legacy technology.

As can be appreciated from the foregoing, embodiments of the invention renders it unnecessary for the designer/implementer to know or to manipulate complex technology in the implementation, maintenance, or upgrade of a data analysis system. The metadata layer abstracts these complex technology details away and provide standardized, easy-to-implement way of specifying how the DAS system should operate to solve any particular analysis problem.

As long as the subcomponents comply with the API model for interoperability, the underlying technology may be interchangeable on a plug-and-play basis. The ease with which the AI-DAS system can be implemented (due to the abstraction of the complex technology details away from the designer/implementer) encourages exploration and renders implementation, maintenance, and upgrade of a data analysis system substantially simpler, faster, and less costly than possible in the current art.

While this invention has been described in terms of several preferred embodiments, there are alterations, permutations, and equivalents, which fall within the scope of this invention. The invention should be understood to also encompass these alterations, permutations, and equivalents. Although sub-section titles have been provided to aid in the description of the invention, these titles are merely illustrative and are not intended to limit the scope of the present invention. It should also be noted that there are many alternative ways of implementing the methods and apparatuses of the present invention. Although various examples are provided herein, it is intended that these examples be illustrative and not limiting with respect to the invention.

What is claimed is:

1. A computer-implemented method for generating business intelligence (BI) results from data obtained from a plurality of data sources, comprising:
   entering a design period where a metadata construct is defined by a user, wherein the metadata construct includes at least one file or library, and wherein the user defines what data is expected in a source data set, format of the data, and how to store, organize, analyze and output the data;
exiting the design period and entering an execution period;
receiving a BI query issued to a computer resource, wherein the BI query is a natural language question asked related to an interest of a business;
matching the metadata construct to the BI query;
selecting underlying data for retrieval based upon the BI query via a machine learned model;
determining presentation format of the underlying data based upon the BI query via the machine learned model;
configuring a data analysis model by the metadata construct;
analyzing the underlying data based upon the configured data analysis model; and
outputting the analyzed data based upon the determined presentation format.

2. The method of claim 1 wherein the model is part of BI logic subcomponent which communicates with other subcomponents using APIs.

3. The method of claim 1 wherein selecting the underlying data employs a virtual cluster of computers available via the Internet.

4. The method of claim 1 wherein said data analysis employs a virtual cluster of computers available via the Internet.

5. The method of claim 1 wherein determining the presentation format employs a virtual cluster of computers available via the Internet.

6. The method of claim 1 wherein said computer resource represents a computing platform including a virtual cluster of computers available via the Internet.

7. The method of claim 1 further comprising interposing a firewall between an internal computer network, which is part of the computer resource, and the Internet.

8. The method of claim 1 wherein said computer resource represents a mixture of a virtual cluster of computers available via the Internet and internal computer network components, said internal computer network residing behind a firewall that interposes between said internal computer network and the Internet.

9. The method of claim 1 wherein the method is executed by a plurality of BI logic subcomponents which includes a mixture of legacy BI logic subcomponents and newly formed BI logic subcomponents, said plurality of BI logic components exchanging data via APIs.

10. The method of claim 5 wherein said presenting also employs said data from said metadata to manage at least one of a format and a visual aspect of said business intelligence insight.

11. A non-transitory storage medium that, when executed on a computer-implemented business intelligence (BI) system for obtaining a business intelligence insight from a plurality of data sources, causes the computer implemented system to perform the steps of:
generating a metadata construct, wherein the metadata construct includes at least one file or library, and wherein the user defines what data is expected in a source data set, format of the data, and how to store, organize, analyze and output the data;
receiving a BI query issued to a computer resource during an execution period after the design period, wherein the BI query is a natural language question asked related to an interest of a business;
matching the metadata construct to the BI query;
selecting underlying data for retrieval based upon the BI query via a machine learned model, determining presentation format of the underlying data based upon the BI query via the machine learned model;
configuring a data analysis model by the metadata construct;
analyzing the underlying data based upon the configured data analysis model; and
outputting the analyzed data based upon the determined presentation format.

12. The non transitory medium of claim 11 wherein selecting the underlying data includes a plurality of data acquisition-related subcomponents which communicate with one another using APIs.

13. The non transitory medium of claim 12 wherein said plurality of data acquisition-related subcomponents is implemented using a virtual cluster of computers available via the Internet.

14. The non transitory medium of claim 11 wherein said non transitory medium is executed using a computing platform including a virtual cluster of computers available via the Internet.

15. The non transitory medium of claim 11 wherein said metadata layer govern behaviors of a set of data presentation-related subcomponents.

* * * * *